United States Patent [19]

Levine

[11] Patent Number: 4,580,170

[45] Date of Patent: Apr. 1, 1986

[54] SUPPRESSION OF FRAME-RATE FLICKER IN CCD IMAGERS USING FIELD INTERLACE

[75] Inventor: Peter A. Levine, Mercer County, N.J.

[73] Assignee: RCA Corporation, Princeton, N.J.

[21] Appl. No.: 685,250

[22] Filed: Dec. 21, 1984

[51] Int. Cl.⁴ .............................................. H04N 3/14
[52] U.S. Cl. .................................... 358/213; 358/221; 358/167
[58] Field of Search ................. 358/213, 212, 221, 44, 358/48, 172, 160, 163, 167, 209; 357/24 LR; 250/578

[56] References Cited

U.S. PATENT DOCUMENTS

| | | | |
|---|---|---|---|
| 4,307,423 | 12/1981 | Atherton | 358/213 |
| 4,317,134 | 2/1982 | Woo et al. | 358/213 |
| 4,378,571 | 3/1983 | Hanoy | 358/213 |
| 4,388,646 | 6/1983 | Strother | 358/160 |
| 4,414,572 | 11/1983 | Flory | 358/172 |
| 4,514,765 | 4/1985 | Miyata et al. | 358/213 |

Primary Examiner—Gene Z. Rubinson
Assistant Examiner—Robert G. Lev
Attorney, Agent, or Firm—Joseph S. Tripoli; George E. Haas; Allen L. Limberg

[57] ABSTRACT

Frame-rate flicker attends the use of field-to-field line interlace in television cameras using CCD imagers. The use of separate dc-restoration circuits for odd-numbered and even-numbered fields suppresses frame-rate flicker attributable to black level variation from field to field.

4 Claims, 2 Drawing Figures

SUPPRESSION OF FRAME-RATE FLICKER IN CCD IMAGERS USING FIELD INTERLACE

The invention relates to charge coupled device (CCD) imagers used to sense radiant energy images in successive fields with interlaced sampling and, more particularly, to the suppression of frame-rate flicker in the video signals derived from such imagers.

BACKGROUND OF THE INVENTION

The video signal samples supplied as output from a CCD imager are customarily a-c coupled to a d-c restoration circuit to be clamped to a prescribed direct potential during line retrace times. During the portion of line retrace that the CCD imager output signal is to be clamped, the output signal is at black level. The a-c coupling customarily is provided by resistive coupling in which the video signal samples pass through a d-c blocking capacitor to appear on the coupling resistance. The coupling resistance may be the input resistance of an amplifying device, for example. This coupling resistance is shunted by a relatively low-resistance clamping resistance during dc restoration. The RC time constant associated with the d-c blocking capacitor and the clamping resistance as divided by the duty factor of clamp, hereinafter referred to as the "clamping time constant", has been found to be a significant factor in controlling the visibility of frame-rate flicker.

Noise components at frequencies above the scan line rate have appreciable amplitude during the short time interval within the line retrace that black level clamping is done. Clamping to these noise components superposed on black level samples-and-holds these components to stretch their durations across full line scans. This gives rise to horizontal streak variations in average brightness across the televised picture, so-called "streak noise". It has been the practice to make the RC time constant many line times long, in order to reduce streak noise by integration; but this has an undesirable side effect associated with it. Frame-rate flicker becomes more noticeable when the clamping time constant is relatively long as compared to a line time.

Frame-rate flicker arises from sources of two general types, the inventor discerns. The first type is where the photoconversion efficiency in one set of alternate fields differs from that in the other set of alternate fields. This causes a difference in the corresponding charge packets in successive fields of static image samples with regard to the amplitudes of their photoresponse components. Frame-rate flicker of this type tends to be reduced by arranging for image integration intervals to be the same duration in all fields. In practice this is usually accomplished by doing two things. Firstly, field transfer times are made to take place at intervals exactly one field time apart, with all field times being of exactly the same length. Secondly, integration voltages applied to the image register gate electrodes in the sets of alternate fields are such as to cause collection efficiencies for all fields to be the same. In any case, this type of frame-rate flicker can be nulled by differentially adjusting gains in alternate fields, and in practice the null adjustment tends to be stable with time.

The second and less obvious type of frame-rate flicker arises from the actual black levels for the two sets of alternate fields differing from each other. The black level samples supplied by a CCD imager of field transfer or interline transfer type, during the periods of dc-restoration clamping, are generated by overscanning the output line register. That is, the output line register, the successive charge transfer stages of which are parallelly loaded with a scan line of charge packets, is subsequently forward clocked at the pixel scan rate. Forward clocking of the output line register proceeds for a long enough time to serially supply from its output port, not only the line of charge packets sampling image, but also an ensuing succession of empty wells that have been clocked across the entire length of the output register. The relatively short duration (53 microseconds or so in broadcast television standard operation) of the passage of an empty well across the line register allows scant time for the collection of accumulated dark current; and, of course, the empty well has no photogenerated charge component.

The black levels, on which the photoresponsive components of charge packets clocked on the CCD imager output stage during line trace are superposed, contain appreciable dark current. The accumulated dark current included in the black level accompanying each photoresponse has two components: one a direct component accumulated in the image register during image integration time, and the other a staircase component accumulated in the field storage register between image transfer and read out. The half line difference in the times alternate fields are stored in the field storage register causes slight (0.2% or so) differences in the dark current components of two fields. More significantly, the black levels in the CCD imager output signal are superposed on relatively large clocking signals. This clock feedthrough can be four times as large as full-well response. In 20 dB-less-than full-well response, a frame rate flicker of 10% or so will be a thousandth of clock feedthrough. So small differences in clock feedthrough on alternate fields can give rise to appreciable frame-rate flicker during the processing of output signal samples from the CCD imager. Such differences in clock feedthrough may be attributed to different static charge patterns on the image register in alternate fields. Frame-rate flicker of the second type described is elusive and difficult to combat in practice, which suggests that a mechanism such as that just discussed—i.e., one involving subtractive combinations of relatively large input signals to separate out a relatively small output signal—is in fact responsible for this persistent frame-rate flicker.

A long clamping time constant in the dc restoration circuit causes the black level of one field to persist into the next to exacerbate the frame-rate flicker, but a several line time constant is required to suppress streak noise. The inventor solves this dilemma by using a several line time constant in the dc restoration of each set of alternate field scans, but rapidly changing the black level to which dc is restored between successive field scans.

The problem of being able to rapidly adjust from one black level to another in different portions of a television signal is encountered in a different timing context in television systems which alternate color difference signals on a line-by-line basis. R. E. Flory in U.S. Pat. No. 4,414,572 issued Nov. 8, 1983 and entitled "CLAMP FOR LINE-ALTERNATE SIGNALS" describes dc-restoration circuitry using keyed clamping of a sort that permits independent restoration of dc levels on alternate sets of lines. Variants of the dc-restoration circuitry, differing from that specifically described by Flory can be constructed which allow independent restoration of dc levels in alternate fields.

SUMMARY OF THE INVENTION

Frame-rate flicker is suppressed in the present invention by switching between separate dc-restoration circuits with long clamping time constants and using a respective one of the dc-restoration circuits for each of the two sets of alternate fields.

DETAILED DESCRIPTION

Figure 1:
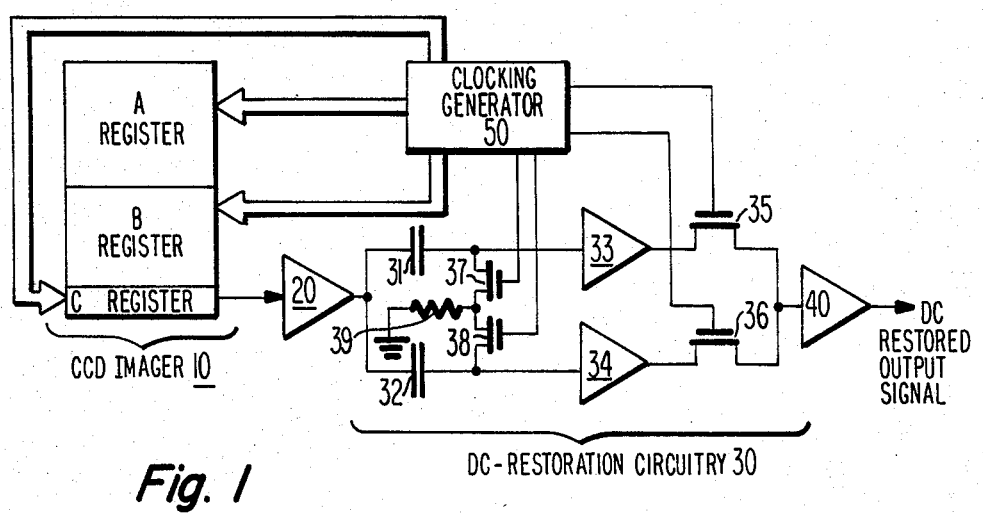
FIG. 1 is a block diagram of a CCD imager followed by a dc restoration circuit, which combination embodies the invention.

In FIG. 1 a CCD imager 10 (shown as being of a field transfer type having A, B and C registers) supplies video signal samples to the input port of a video preamplifier 20. Video preamplifier 20 is a voltage amplifier providing video output samples at relatively low source impedance from its output port to dc-restoration circuitry 30. Video preamplifier 20 also includes circuitry for deriving a continuous video signal from video samples CCD imager 10 supplies to its input port. This may be done by simple low-pass filtering. But it is preferable to use sample-and-hold circuitry followed by low-pass filtering. The sample and hold circuitry may be preceded by a high-pass filter so the sample and hold circuitry performs a synchronous detection of CCD imager 10 output signal samples at C register clocking rate. Circuitry 30 restores dc in accordance with the invention for application to the input port of a further video amplifier 40.

In dc-restoration circuitry 30, equal-value dc blocking capacitors 31 and 32 connect the output port of video pre-amplifier 20 to the input ports of video amplifiers 33 and 34 respectively. Video amplifier 33 and 34 have high input impedances to avoid leakage of charge off dc-blocking capacitors 31 and 32 into their input ports. Assume successive field scans of CCD imager 10 output signal are consecutively numbered. A transmission gate 35 connects the output port of video amplifier 33 to the input port of further video amplifier 40 only during odd-numbered fields, and transmission gate 36 connects the output port of video amplifier 34 to the input port of further video amplifier 40 only during even-numbered fields.

During odd-numbered fields, during the time after each line trace interval in which CCD imager 10 C register continues to be clocked to supply reference-black-level samples, a transmission gate 37 is used to clamp the input port of video amplifier 33 to a prescribed direct potential through a clamp resistance 39, re-charging capacitor 31 so it will hold restored dc level when transmission gate 37 is non-conductive during the ensuing line trace interval. A transmission gate 38, used to selectively clamp video amplifier 34 input port to the prescribed direct potential during even-numbered field scans, is continuously non-conductive throughout each odd-numbered field.

During even-numbered fields, during the time after each line trace interval in which CCD imager 10 C register continues to be clocked to supply reference-black-level samples, transmission gate 38 clamps the input port of video amplifier 34 to the prescribed direct potential through clamp resistance 39, re-charging capacitor 32 so it will hold restored dc level when transmission gate 38 is non-conductive the ensuing line trace interval. Transmission gate 37 is continuously non-conductive throughout each even-numbered field.

Clock generator 50 controls the switching of transmission gates 35, 36, 37 and 38 in accordance with the invention as described above, in addition to supplying clocking signals to the A, B and C registers of CCD imager 10 in accordance with conventional practice.

Figure 2:
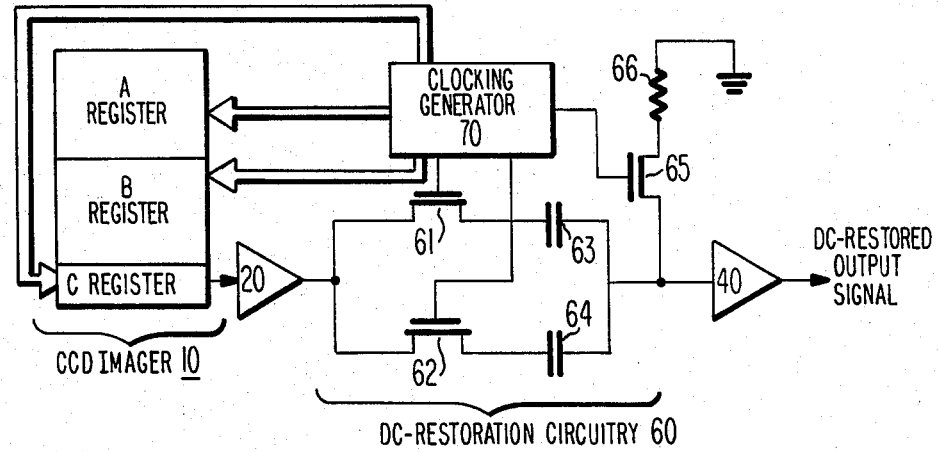
FIG. 2 is a block diagram of an alternative embodiment of the invention.

FIG. 2 shows a modification of FIG. 1 using simpler dc-restoration circuitry 60. Transmission gate 61 conducts only during odd-numbered fields, to connect capacitor 63 as dc-blocking capacitor between the output port of video pre-amplifier 20 and the input port of further video amplifier 40. Transmission gate 62 conducts only during even-numbered fields, to connect capacitor 64 as dc-blocking capacitor between output port of video pre-amplifier 20 and the input port of further video amplifier 40. In every field, during the time interval after each line trace interval in which CCD imager 10 C register continues to be clocked to supply reference-black-level samples, a transmission gate 65 clamps the input port of further video amplifier 40 to prescribed direct potential through clamp resistance 66. The one of capacitors 63 and 64 selected as dc-blocking capacitor for that field is recharged through clamp resistance 66, and the selected capacitor will hold restored dc level the ensuing line trace interval.

Clock generator 70 controls the switching of transmission gates 61, 62, 65 in accordance with the invention as described in the preceding paragraph, in addition to supplying clocking signals to the A, B and C registers of CCD imager 10 in accordance with conventional practice. Elements 61 and 63 may be reversed in order in their series connection, as may elements 62 and 64.

Variants of the invention where black-reference-level samples are stored in an extended C register to be read out preceding line trace, but following parallel loading of image samples into the C register are possible. Transmission gates 37, 38 in the FIG. 1 circuit can be field effect transistors controlled in such a way that their channel resistances when conductive can provide the clamp resistance, which permits resistor 39 to be replaced by direct connection. Transmission gate 65 in the FIG. 2 circuit can be a field effect transistor so controlled that its channel resistance when conductive can provide clamp resistance so resistor 66 can be replaced by direct connection. While transmission gates 35–38 and 61, 62, 65 are each shown as a respective single insulated gate field effect transistor, other types of transmission gate or equivalents may be used. The invention can be practiced both where baseband components of the CCD imager output spectrum are used to generate video signal and where the harmonic spectra around output register clocking signal are synchronously detected to generate video signal. These variants of the invention should be considered when construing the scopes of the claims which follow.

What is claimed is:
1. A television camera comprising:
   a solid-state imager having an image register for receiving an image field, having a CCD output line register arranged for being parallelly loaded with image samples during respective time intervals preceding each line trace interval and for being serially unloaded by being forward clocked during each line trace interval to supply those image samples and during additional respective time intervals succeeding each line trace interval to supply reference-black-level samples, having means for loading said CCD output line register with image samples sampling along a first set of scan lines in said image register during odd-numbered fields scans and along a second set of scan lines in said image register during even-numbered field scans, which first and second sets of scan lines are interlaced with each other, and having means for supplying an output signal responsive to the samples supplied from said CCD output line register;

means for restoring dc to the output signal during odd-numbered field scans independently of the output signal during even-numbered field scans; and means for restoring dc to the output signal during even-numbered field scans independently of the output signal during odd-numbered field scans.

2. A television camera as set forth in claim 1 wherein the first portion of each line retrace follows in time is second portion, said reference-black-level samples being generated by the clocking of empty well samples through said CCD output line register following said image samples.

3. A television camera comprising:

a solid-state imager having an image register for receiving an image field, having a CCD output line register arranged for being parallelly loaded with image samples during respective time intervals preceding each line trace interval and for being serially unloaded by being forward clocked during each line trace interval and during additional respective time intervals succeeding each line trace interval to supply reference-black-level samples, having means for loading said CCD output line register with image samples sampling along a first set of scan lines in said image register during odd-numbered field scans and along a second set of scan lines in said image register during even-numbered field scans, which first and second sets of scan lines are interlaced with each other, and having means for supplying an output signal responsive to the samples supplied from said CCD output line register;

a video pre-amplifier having an input port to which the output signal of said solid-state imager is applied and having an output port;

first and second video amplifiers having respective input ports and respective output ports;

a first dc-blocking capacitor in a connection of the output port of said video pre-amplifier to the input port of said first video amplifier;

a second dc-blocking capacitor in a connection of the output port of said video pre-amplifier to the input port of said second video amplifier;

means for clamping only during said additional time intervals in said odd-numbered field scans the input port of said first video amplifier to a prescribed direct potential;

means for clamping only during said additional time intervals in said even-numbered field scans the input port of said second video amplifier to a prescribed direct potential; and means for selecting the dc restored output signal from the output port of said first video amplifier during odd-numbered field scans and from the output port of said second video amplifier during even-numbered field scans.

4. A television camera comprising:

a solid-state imager having an image register for receiving an image field, having a CCD output line register arranged for being parallelly loaded with image samples during respective time intervals preceding each line trace interval and for being serially unloaded by being forward clocked during each line trace interval and during additional respective time intervals succeeding each line trace interval to supply reference-black-level samples, having means for loading said CCD output line register with image samples sampling along a first set of scan lines in said image register during odd-numbered field scans and along a second set of scan lines in said image register during even-numbered field scans, which first and second sets of scan lines are interlaced with each other, and having means for supplying an output signal responsive to the samples supplied from said CCD output line register;

a video pre-amplifier having an input port to which the output signal of said solid-state imager is applied and having an output port;

a video amplifier having an input port and an output port;

first and second dc-blocking capacitors;

means for selectively connecting the output port of said video pre-amplifier to the input port of said video amplifier through said first dc-blocking capacitor in odd-numbered field scans and through said second dc-blocking capacitor in even-numbered field scans, respectively; and means for clamping the input port of said video amplifier to a prescribed direct potential during said additional time intervals.

* * * * *